COLOR TELEVISION COLOR KILLER WITH VARIABLE SENSITIVITY
Original Filed Dec. 3, 1962
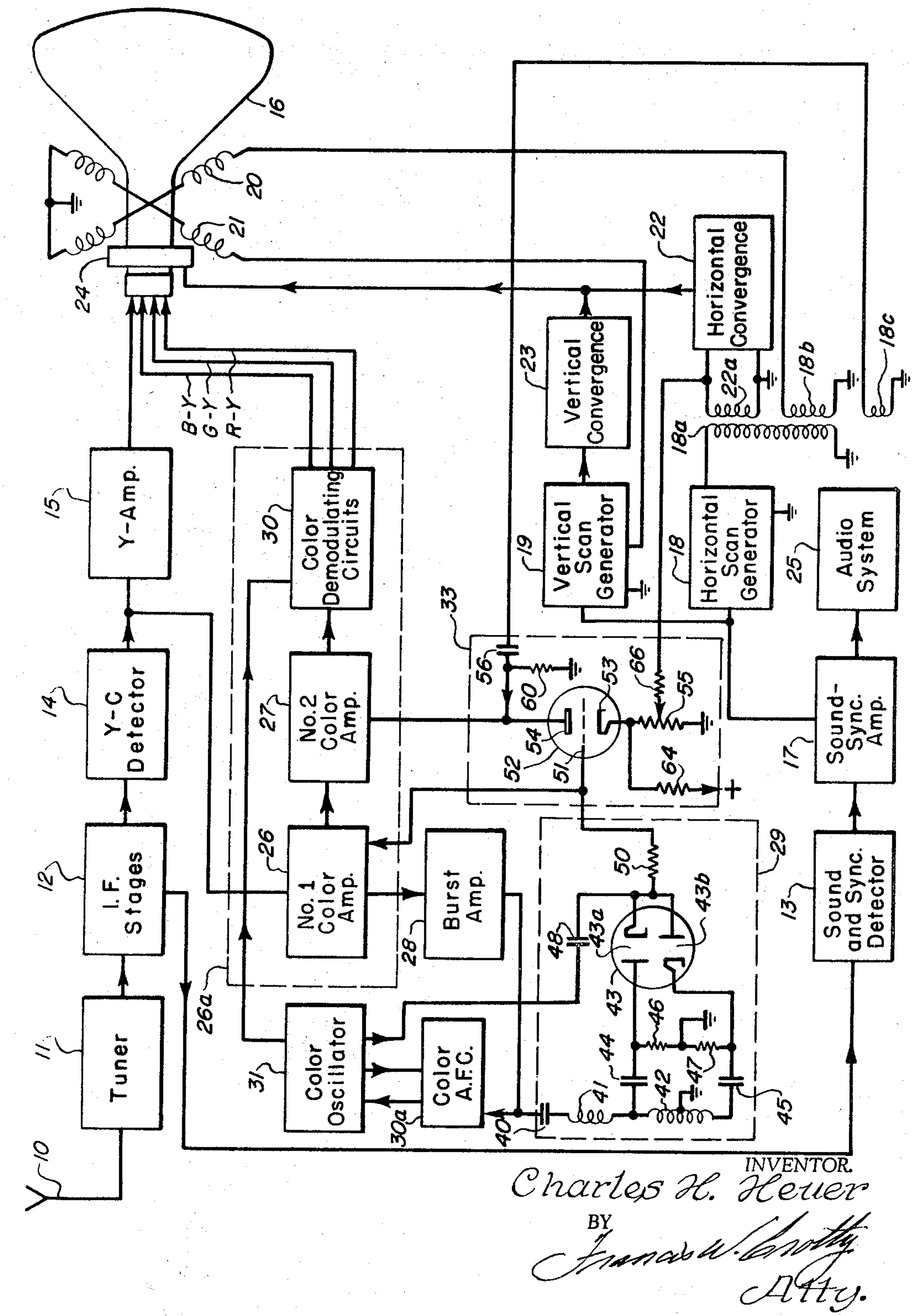
INVENTOR.
Charles H. Heuer
BY
Francis W. Crotty
Atty.

United States Patent Office 3,308,231

Patented Mar. 7, 1967

3,308,231

COLOR TELEVISION COLOR KILLER WITH VARIABLE SENSITIVITY

Charles H. Heuer, Glencoe, Ill., assignor to Zenith Radio Corporation, Chicago, Ill., a corporation of Delaware Continuation of application Ser. No. 241,961, Dec. 3, 1962. This application Mar. 16, 1966, Ser. No. 534,917
4 Claims. (Cl. 178—5.4)

This is a continuation of application Serial No. 241,961 filed December 3, 1962, now abandoned, and assigned to the same assignee as the present invention.

The present invention relates to color television. More particularly, it is directed to circuitry for use in the color-killer portion of such a receiver.

In color television receivers, it is conventional practice to provide circuitry for de-energizing the color or chrominance circuits during the reception of monochrome program transmissions. If the color processing circuits are not deactivated during monochrome reception, the color circuitry may respond to spurious signals generated within the receiver or associated with the incoming signal. Consequently, a multitude of sporadic color areas would appear in the reproduced raster. To eliminate this undesirable effect, a color-killer circuit causes the color processing circuits of the receiver to be operative only in response to the presence of information normally found exclusively in a color program signal. Customarily, the color-killer circuit operates in response to the color synchronizing component or burst signal of a received telecast to render the color processing circuits operative. When no burst signal is included in the program being received, the color circuits are inoperative.

Normally, the color burst signal is separated from the remainder of the received color signal and applied to a phase detector which provides an output for controlling the color-killer circuit. The phase detector compares the incoming burst signal with a locally generated signal synchronized to the burst frequency and produces one output signal when the two signals are present and another output signal when the burst signal is not present, however, some conventional phase detetctors do not produce an output when the burst signal is not present. Obviously, it is of importance that the color-killer circuit be sensitive in order that it may always activate the color processing circuits in response to a color program; however, the color-killer circuit should keep the color processing circuits deactivated even in the presence of spurious signals when the transmission is of the monochrome type. Some prior art arrangements do not have sufficient adustability and do not respond to low amplitude output signals of the phase detector indicative of color program transmission. On the other hand, other prior art arrangements cannot be rendered sufficiently insensitive and they respond to erroneous output signals of the phase detector generated in the presence of noise associated with a monochrome transmission or reproduced within the receiver itself. It is thus desirable to provide an improved color-killer circuit capable of correct response to the majority of color and monochrome signal conditions encountered in practice. However, the operation of the color-killer circuit must not affect the operation of other circuits of the receiver, for example, the automatic chrominance control circuit, which is also controlled by the output signal of the phase detector.

It is, therefore, an object of this invention to provide a new and improved color circuit for color television receivers.

It is a further object of this invention to provide a new and improved circuit which overcomes the disadvantages and deficiencies of prior color-killer circuits.

It is another object of this invention to provide a color-killer circuit which has a high degree of adjustability.

It is still another object of this invention to provide a color-killer circuit which has a variable sensitivity.

It is an additional object of this invention to provide a color-killer circuit which may be adjusted without affecting the operation of other circuits of the receiver.

Color television apparatus constructed in accordance with the invention includes an image reproducer for receiving a television signal modulated with both luminance and chrominance information and comprises a first source of pulses having a predetermined polarity, a second source of pulses having a polarity opposite that of the first source and means for selecting, amplifying and detecting the television signal. Also included in the apparatus is a chrominance information processing channel, coupled to the aforesaid selecting, amplifying and detecting means, for developing from at least a portion of the chrominance information a signal for use by the image reproducer. Means coupled to the selecting, amplifying and detecting means respond to reception of at least a portion of the chrominance information to develop a control signal of predetermined polarity. There is also provided a color killer comprising a signal translating device having a first input electrode coupled to the control signal developing means, a second input electrode and an output electrode which is connected to the chrominance information processing channel for selectively rendering that channel operative in response to the presence of a control signal at the first electrode. A biasing means, comprising a variable impedance device, is connected to the second input electrode and has an adjustable control element for setting the sensitivity of the signal translating device. Additionally, means are provided for applying a unidirectional potential to the second input electrode with a polarity tending to cut-off the signal translating device. A gating circuit is coupled to the first pulse source for applying energizing pulses to the output electrode of the signal translating device to render that device conductive. Finally, there is provided coupling means comprising a DC resistance path for applying a biasing pulse from the second pulse source to the control electrode of the variable impedance device in synchronism with the application of energizing pulses to its output electrode. The control electrode is adjustable to vary the magnitudes of the biasing pulse and the biasing potential, is applied to the second input electrode, in opposite senses to permit adjustment of the resultant bias voltage for the second input electrode throughout a range extending above and below a zero biasing potential.

The features of this invention which are believed to be novel are set forth with particularity in the appended claims. The invention, together with further objects and advantages thereof, may be best understood, however, by reference to the following description taken in conjunction with the accompanying drawing in which a block schematic diagram of a color television receiver incorporating the invention is shown.

In the color television receiver shown in the figure, an antenna 10 is connected to the input circuit of a tuner 11 which comprises one or more stages of radio-frequency amplification and a converter or first detector. Coupled to tuner 11 is an intermediate-frequency (IF) amplifier 12 of any desired number of stages having a pair of outputs connected to a pair of detectors 13 and 14, one for deriving the sound signal components and the other for deriving the brightness (Y) and chrominance (C) signal components. Tuner 11, IF amplifier 12 and detector 14 serve as means for selecting, amplifying and detecting the television signal. The sound detector 13 is also used to derive synchronizing (sync) information as is conventional; however, it is known to utilize either detector for obtaining synchronizing information. One output circuit of detector 14 is coupled to a Y-amplifier 15 of any desired number of stages which drives the cathodes of each of three electron guns of a conventional three-beam tri-color kinescope 16.

The sound and sync signal output of sound detector 13 connects to a sound-sync amplifier 17 of one or more stages which includes a synchronizing-signal-separator. A sync signal output of amplifier 17 drives both a horizontal scanning signal generator 18 and a vertical scanning signal generator 19. Horizontal scanning signal generator 18 includes a line frequency oscillator, a phase detector and a frequency control stage for providing automatic control of the oscillator frequency. The generated horizontal scanning signal is applied to an output transformer including a primary winding 18*a* which couples the horizontal signal to a horizontal scanning coil 20 by way of a secondary winding 18*b*. Vertical scanning generator 19 is coupled to a vertical deflection yoke or coil 21.

Another transformer winding 22*a* couples horizontal scanning generator 18 to a horizontal convergence network 22 which develops appropriate dynamic convergence signals for application to a convergence yoke 24 associated with tri-color kinescope 16. Winding 22*a* may be considered to be a portion of the horizontal convergence network while it is, in fact, a winding on the horizontal output transformer 18*a*, 18*b*. A vertical convergence network 23 coupled to and driven by vertical generator 19 develops vertical dynamic convergence signals which are also applied to yoke 24.

An automatic gain control system may be included within unit 17 to develop an AGC potential for application to tuner 11 or IF amplifier 12 as is well understood in the art. An intercarrier sound signal derived from a sound-signal output circuit of amplifier 17 is applied to a conventional audio system 25 which comprises a limiter, a discriminator, an audio amplifier of any desired number of stages, and a loudspeaker or other sound reproducing device.

In order to translate the color information of a received colorcast the output circuit of Y–C detector 14 connects through a first color amplifier 26 and second color amplifier 27 to a color demodulator 30. The first color amplifier also supplies an amplified signal to a burst amplifier 28 which connects to both a color automatic frequency control (AFC) network 30*a* and to an automatic chroma control (ACC) phase detector network 29 which will be explained in more detail subsequently. The color AFC network provides a control signal which is used to control a color oscillator 31 which includes a conventional reactance tube arrangement. The signal generated by color oscillator 31 is fed to the demodulator 30 which may include a pair of synchronous demodulators for developing three color difference signals R–Y, G–Y and B–Y corresponding to the chrominance information associated with the three primary colors red, green and blue. The several outputs of demodulator 30 of which the color difference signals are available connect respectively to the control grids of three electron guns of kinescope 16. Color amplifiers 26, 27 and demodulator 30 form the chrominance information processing channel 26*a* of the receiver which is used for developing, from at least a portion of the chrominance information of the detected signal, signals for use by image reproducer 16.

The operating frequency of color oscillator 31 corresponds with that of the color burst or color synchronizing signal of the received colorcast. The comparison of these signals in phase detector 29 produces a signal which is indicative of the reception of a colorcast and which varies in magnitude in accordance with the level of the incoming color signal as derived at detector 14. The output of phase detector 29 connects to a grid of color amplifier 26 to vary the gain of the tube to compensate for signal level variations. This output circuit of the phase detector is also coupled to a color-killer network 33 which is coupled to a winding 18*c* of the horizontal system to receive therefrom a gating pulse at the horizontal scanning rate. The operation of color-killer 33 will be explained in more detail hereafter.

As thus described, the receiver is entirely conventional and only a brief description of its operation need be recited. The received color telecast intercepted by antenna 10 is selected by appropriate adjustment of tuner 11 where it is amplified and converted to an intermediate-frequency signal which is amplified in amplifier 12. The intermediate-frequency signal is then applied to Y–C detector 14 and to sound and sync detector 13. The luminance output of detector 14 is applied to Y amplifier 15 and thence to the cathodes of picture tube 16. Furthermore, Y–C detector 14 supplies an output signal through color amplifiers 26 and 27 to demodulator 30 which develops the chrominance signal information for concurrent application to the three electron guns of tube 16. The color burst portion of the incoming signal is applied from burst amplifier 28 to color AFC detector 30*a* which synchronizes color oscillator 31. Phase detector 29 also receives the color burst of the incoming signal, compares it with the local generated signal of color oscillator 31 and provides an output signal indicative of the presence and magnitude of the chrominance portion of the detected television signal. The output signal of ACC detector 29 controls the gain of color amplifier 26 and is also presented to color-killer circuit 33 wherein the signal is amplified and used to control the conductivity of the amplifier tube of the second color amplifier 27.

The output signal from sound and sync detector 13, through amplifier 17, drives audio system 25 in known fashion to reproduce the audio program accompanying the telecast and concurrently controls the horizontal and vertical sweep circuits 18 and 19. Accordingly, appropriate synchronized scanning signals are developed and applied to deflection coils 20, 21 of picture tube 16 to deflect the electron beams thereof across the target electrode as required to develop an image raster. Since the electron beams are suitably modulated by luminance information from amplifier 15 and by chrominance information from network 30, their traverse across the screen under the influence of the deflection fields of coils 20, 21 results in the reproduction of a visual image. The reproduction is that of three image fields effectively superposed to yield an image in simulated natural color.

More particular consideration will now be given to the circuitry of ACC phase detector 29 and color-killer 33. Burst amplifier 28 connects to a coil 42 of phase detector 29 through the series arrangement of a direct current blocking capacitor 40 and a radio-frequency choke or inductor 41. Coil 42 is center-tapped to ground and its opposed terminals are coupled through capacitors 44 and 45, respectively, to the anode of a diode section 43*a* and to the cathode of a diode section 43*b* of a duo-diode 43. Capacitors 44, 45 are also respectively coupled to ground by way of resistors 46, 47. While the burst signal is applied to the diode sections in push-pull relation, the signal from color oscillator 31, is applied in push-push relation to the cathode of diode 43*a* and to the anode of diode 43*b* by way of a capacitor 48. A control signal developed by phase detector 29 is supplied through a resistor 50 which connects to the grid 51 of a color-killer tube 52. This control signal is also applied to a control grid in first color amplifier 26 to vary its gain inversely in accordance with the strength of the incoming signal.

Color-killer tube 52 has a cathode 53 which is biased by a source of positive potential through a resistor 64 and is coupled to ground through a potentiometer 55. The tap of potentiometer 55 is coupled through a resistor 66 to winding 22*a* of the horizontal convergence network so that reoccurring negative going pulses may be applied to the cathode of tube 52. This connection from the horizontal system to potentiometer 55 comprises means included in the grid-cathode or input circuit of tube 52 for applying a voltage pulse to change the sensitivity of the color-killer tube. Anode 54 of tube 52 is coupled to a winding 18c in the horizontal system through a capacitor 56 to receive a positive gating signal to render color-killer circuit 33 operative. A resistor 60 couples anode 54 to ground and their junction is coupled to a control grid in second color amplifier 27 to vary the conductivity of that amplifier. When the signal produced by tube 52 indicates the presence of a burst signal in the received telecast as determined by the output of phase detector 29, the color-killer circuit selectively renders the chrominance information processing channel, specifically amplifier 27, operative in response to the presence of at least a portion of the chrominance information of the received signal.

In operation, during a monochrome telecast, only the locally generated color signal is presented to ACC-killer detector 29 at the connection between the anode of diode **43*b* and the cathode of diode 43*a*. As the alternating voltages applied to the diodes are equal, the direct current voltages across the diodes, generated by rectification, are equal. Thus, the output signal present between the junction of resistors 46 and 47 and the junction of the diodes by way of resistor 50 is zero. Under these conditions, no control voltage is applied to the grid of color-killer tube 52 and the color-killer tube is allowed to conduct in response to the gating potentials applied to its anode. Tube 52 develops a high negative voltage at its plate 54 which is fed to the control grid of a tube in color amplifier 27. This negative voltage is generated because the sole plate supply voltage for tube 52 is the positive pulse supplied from winding 18c of the horizontal output transformer. During the short conduction interval permitted by the pulse, capacitor 56 is charged while during the remainder of the horizontal period, capacitor 56 discharges through resistor 60 resulting in a negative control bias required to render amplifier 27** inoperative.

During a color telecast, both the burst signal and the locally generated color signal are coupled to ACC-color-killer detector 29. When the locally generated color signal is synchronized to the burst by the AFC detector **30*a*, the phase relationships in detector 29 are such that the output of detector 29 is a negative direct current voltage. The burst signal is in phase with the local color signal as applied to the electrodes of diode 43*b* and is out of phase with the local color signal as applied to the electrodes of diode 43*a*. The result is unequal direct current voltages across diodes 43*a* and 43*b* and a net negative direct current voltage at output resistor 50. The amplitude of the incoming burst signal determines the amount of this negative voltage which is applied to color amplifier 26 to vary its gain inversely in accordance with the signal level of the detected chrominance information. This negative voltage, which is also applied to control grid 51, is sufficient in amplitude to maintain the color-killer tube cut-off thus rendering color amplifier 27** operative during the reception of a colorcast.

Adjustment of the color-killer circuit of the invention is accomplished by providing a combination of direct current and pulse bias voltages in the cathode circuit of tube 52. The color-killer is a time-gated amplifier and its only plate supply voltage is the positive going horizontal frequency pulse of winding 18c. Consequently, it is sufficient to provide the desired bias voltage to the cathode of tube 52 only during the time interval when the plate voltage is applied to render the tube conductive. The positive bias voltage is added to the negative pulse voltage and the setting of potentiometer 55 determines the effective or net cathode voltage during the interval that the plate voltage is applied to tube 52. The potentiometer setting in conjunction with the output signal of the phase detector network 29 determine the conductive status of tube 52.

When the wiper arm of potentiometer 55 is at the grounded end of the potentiometer, no pulse is applied to the cathode 53 and it is at a positive potential as determined by resistors 64 and 55. This tends to cut-off the color-killer tube 52 and a minimum negative voltage output from phase detector 29, representing even a weak signal color telecast, will complete the cut-off of tube 52 and turn on color amplifier 27. As the potentiometer arm is moved away from ground, resistor 66 shunts part of the resistance of the potentiometer through winding **22*a* thereby reducing the positive direct current bias voltage at the cathode 53. With movement of the potentiometer arm, the portion of the negative pulse applied to cathode 53 from winding 22*a* across the potentiometer is increased. This is a further reduction in the applied cathode bias at conduction time and renders the color-killer tube less sensitive to the output of detector output 29 so that a greater output signal from the phase detector will be required to turn color amplifier 27** on.

Merely by way of illustration and in no sense by way of limitation, the following component values were employed in the figure:

| | |
|---|---|
| Tube 52 (6BN8) | ½ |
| Resistor 64, ohms | 270,000 |
| Potentiometer 55, ohms | 5000 |
| Resistor 66, ohms | 1800 |
| Cathode D.C. bias source, volts | +250 |
| Pulse voltage of winding 22*a*, volts | −15 |
| Pulse Voltage of Winding 18*c*, volts | +200 |

As explained, cathode 53 can be made positive or negative with respect to ground during the time interval that the pulse voltage is applied to anode 54. Consequently, the color-killer sensitivity or threshold can be adjusted in either direction from a nominal value corresponding to zero volts at the cathode of the color-killer tube and a wide range of adjustment is provided without affecting the operation of the ACC circuits of the receiver.

Thus, the invention provides a new and improved color-killer circuit which has a high degree of adjustability so that its sensitivity may be selectively varied through a wide range without effecting the operation of other circuits of the receiver. With this arrangement, the color-killer circuit is rendered less responsive to noise and a reproduced raster void of sporadic colored areas is provided.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. Color television apparatus for receiving a television signal modulated with both luminance and chrominance information comprising:

an image reproducer;

a first source of pulses having a predetermined polarity;

a second source of pulses having a polarity opposite said predetermined polarity;

means for selecting, amplifying and detecting said television signal;

a chrominance information processing channel, coupled to said selecting, amplifying and detecting means, for developing from at least a portion of said chrominance information, a signal for use by said image reproducer;

means coupled to said selecting, amplifying and detecting means and responsive to reception of at least a portion of said chrominance information for developing a control signal of predetermined polarity;

a color-killer comprising a signal translating device having a first input electrode coupled to said control signal developing means, a second input electrode, and an output electrode connected to said chrominance information processing channel for selectively rendering said channel operative in response to the presence of a control signal at said first electrode;

biasing means comprising a variable impedance device connected to said second input electrode and having an adjustable control element for setting the sensitivity of said signal translating device, and means for applying a unidirectional potential to said second input electrode with a polarity tending to cut-off said signal translating device;

a gating circuit coupled to said first pulse source for applying energizing pulses to said output electrode to render said signal translating device conductive;

and coupling means comprising a D.C. resistance path for applying biasing pulses from said second pulse source to said control element of said variable impedance device in synchronism with the application of said energizing pulses to said output electrode, said control element being adjustable to vary the magnitudes of said biasing pulse and said biasing potential, as applied to said second input electrode, in opposite senses to permit adjustment of the resultant bias voltage for said second input electrode throughout a range extending above and below a zero biasing potential.

2. Color television apparatus as set forth in claim 1 in which said first source generates positively polarized pulses;

said second source generates negatively polarized pulses;

and said means for applying a unidirectional potential to said second input electrode comprises a source of positive potential.

3. Color television apparatus as set forth in claim 2 in which said means coupled to said selecting, amplifying and detecting means develops a control signal of negative polarity, said biasing means comprises the series combination of a fixed resistor and a potentiometer having an adjustable control arm, the juncture of said resistor and said potentiometer being connected to said second input electrode;

said positive unidirectional potential is applied across said series combination;

and said negatively polarized biasing pulses are applied to said control arm of said potentiometer.

4. Color television apparatus for receiving a television signal modulated with both luminance and chrominance information comprising:

a multi-beam cathode ray tube;

a beam deflection system comprising a source of positively polarized pulses;

a convergence network comprising a source of negatively polarized pulses;

means for selecting, amplifying and detecting said television signal;

a chrominance information processing channel, coupled to said selecting, amplifying and detecting means, for developing from at least a portion of said chrominance information, a signal for use by said image reproducer;

means coupled to said selecting, amplifying and detecting means and responsive to reception of at least a portion of said chrominance information for developing a control signal of negative polarity;

a color-killer comprising an electron discharge device having a control electrode coupled to said control signal developing means, a cathode electrode, and an anode electrode connected to said chrominance information processing channel for selectively rendering said channel operative in response to the presence of a control signal at said control electrode;

biasing means comprising the series combination of a fixed resistor and a potentiometer having an adjustable control arm for setting the sensitivity of said electron discharge device, the juncture of said resistor and said potentiometer being connected to said cathode, and means for applying a positive unidirectional potential across said series combinations;

a gating circuit coupled to said beam deflection system for applying energizing pulses to said anode to render said electron discharge device conductive;

and coupling means comprising a D.C. resistance path for applying biasing pulses from said convergence network to said control arm of said potentiometer in synchronism with the application of said energizing pulses to said anode, said control arm being adjustable to vary the magnitudes of said biasing pulse and said biasing potential, as applied to said cathode, in opposite senses to permit adjustment of the resultant bias voltage for said cathode throughout a range extending above and below a zero biasing potential.

References Cited by the Examiner

UNITED STATES PATENTS

| | | | |
|---|---|---|---|
| 2,897,262 | 7/1959 | Rogers | 178—5.4 |
| 2,913,519 | 11/1959 | Macovski et al. | 178—5.4 |
| 2,954,425 | 9/1960 | Richman | 178—5.4 |

OTHER REFERENCES

RCA Model 21–CT–8785, Service data 1957 No. T8, first printing May 29, 1957.

DAVID G. REDINBAUGH, *Primary Examiner.*

ROBERT SEGAL, *Examiner.*

J. O'BRIEN, *Assistant Examiner.*